(12) United States Patent
Perego et al.

(10) Patent No.: US 9,576,703 B2
(45) Date of Patent: Feb. 21, 2017

(54) ENERGY CABLE HAVING STABILIZED DIELECTRIC RESISTANCE

(75) Inventors: Gabriele Perego, Milan (IT); Sergio Belli, Milan (IT)

(73) Assignee: PRYSMIAN S.P.A., Milan (IT)

( * ) Notice: Subject to any disclaimer, the term of this patent is extended or adjusted under 35 U.S.C. 154(b) by 651 days.

(21) Appl. No.: 13/996,294

(22) PCT Filed: Dec. 23, 2010

(86) PCT No.: PCT/IB2010/003342
§ 371 (c)(1),
(2), (4) Date: Aug. 30, 2013

(87) PCT Pub. No.: WO2012/085612
PCT Pub. Date: Jun. 28, 2012

(65) Prior Publication Data
US 2013/0344329 A1    Dec. 26, 2013

(51) Int. Cl.
*H01B 7/28* (2006.01)
*H01B 3/22* (2006.01)
(Continued)

(52) U.S. Cl.
CPC ............ *H01B 7/2813* (2013.01); *C08L 23/12* (2013.01); *C08L 23/142* (2013.01); *H01B 3/22* (2013.01);
(Continued)

(58) Field of Classification Search
USPC ............................. 174/110 R, 120 R, 121 SR
See application file for complete search history.

(56) References Cited

U.S. PATENT DOCUMENTS 4,305,849 A   12/1981   Kawasaki et al.
4,370,517 A   1/1983    Soma et al.
(Continued)

FOREIGN PATENT DOCUMENTS

EP   0 814 485 A1   12/1997
EP   2 163 576 A1    3/2010
(Continued)

OTHER PUBLICATIONS

"Standard Test Method For Flow Rates of Thermoplastics by Extrusion Plastometer", ASTM, Designation D 1238 90b, pp. 393-401, (1990).
(Continued)

*Primary Examiner* — Lynda Salvatore
(74) *Attorney, Agent, or Firm* — Finnegan, Henderson, Farabow, Garrett & Dunner, L.L.P.

(57) ABSTRACT

A cable includes at least one electrical conductor and at least one electrically insulating layer surrounding the electrical conductor, wherein the at least one electrically insulating layer includes: (a) a thermoplastic polymer material selected from: at least one copolymer (i) of propylene with at least one olefin comonomer selected from ethylene and an a-olefin other than propylene, the copolymer having a melting point greater than or equal to 130° C. and a melting enthalpy of 20 J/g to 90 J/g; a blend of at least one copolymer (i) with at least one copolymer (ii) of ethylene with at least one α-olefin, the copolymer (ii) having a melting enthalpy of 0 J/g to 70 J/g; a blend of at least one propylene homopolymer with at least one copolymer (i) or copolymer (ii); at least one of copolymer (i) and copolymer (ii) being a heterophasic copolymer; (b) at least one dielectric fluid intimately admixed with the thermoplastic polymer material; and (c) at least one water tree retardant selected from ethoxylated fatty acids and amide derivatives thereof.

15 Claims, 1 Drawing Sheet

(51) Int. Cl.
*H01B 3/44* (2006.01)
*C08L 23/12* (2006.01)
C08K 5/10 (2006.01)
C08K 5/20 (2006.01)
C08L 23/14 (2006.01)
C08L 71/02 (2006.01)

(52) U.S. Cl.
CPC .............. *H01B 3/441* (2013.01); *C08K 5/10* (2013.01); *C08K 5/20* (2013.01); *C08L 23/14* (2013.01); *C08L 71/02* (2013.01); *C08L 2203/202* (2013.01); *Y10T 428/294* (2015.01)

(56) References Cited

U.S. PATENT DOCUMENTS

| 4,870,121 | A | 9/1989 | Bamji et al. | |
|---|---|---|---|---|
| 5,420,185 | A | 5/1995 | Watanabe et al. | |
| 7,884,284 | B2* | 2/2011 | Perego | C08L 23/10 174/110 R |
| 2004/0038030 | A1 | 2/2004 | Castellani et al. | |
| 2006/0124341 | A1 | 1/2006 | Perego et al. | |
| 2009/0211782 | A1 | 8/2009 | Perego et al. | |
| 2009/0227717 | A1* | 9/2009 | Smedberg | B32B 5/26 524/317 |
| 2011/0220392 | A1 | 9/2011 | Hjertberg et al. | |
| 2013/0233604 | A1 | 9/2013 | Perego | |

FOREIGN PATENT DOCUMENTS

| RU | 2 191 439 C2 | 4/2002 |
|---|---|---|
| RU | 2313841 C1 | 12/2007 |
| WO | WO 98/52197 A1 | 11/1998 |
| WO | WO 99/21194 | 4/1999 |
| WO | WO 99/31675 A1 | 6/1999 |
| WO | WO 01/08166 A1 | 2/2001 |
| WO | WO 02/03398 A1 | 1/2002 |
| WO | WO 02/27731 A1 | 4/2002 |
| WO | WO 02/47092 A1 | 6/2002 |
| WO | WO 2004/066317 A1 | 8/2004 |
| WO | WO 2004/066318 A1 | 8/2004 |
| WO | WO 2005/055250 A1 | 6/2005 |
| WO | WO 2007/048422 A1 | 5/2007 |
| WO | WO 2008/058572 A1 | 5/2008 |
| WO | WO 2010/072396 | 7/2010 |
| WO | WO 2012/069864 | 5/2012 |

OTHER PUBLICATIONS

"Standard Test Method For Kinematic Viscosity of Transparent and Opaque Liquids (and The Calculation of Dynamic Viscosity)", ASTM, American National/British Standard 2000, Part 71:1990, Designation D 445-03, pp. 1-10 (1990).

"Standard Test Method For Characteristic Groups in Rubber Extender and Processing Oils and Other Petroleum-Derived Oils by The Clay-Gel Absorption Chromatographic Method", ASTM, Designation D Feb. 2007, pp. 1-8, (2002).

Faremo et al.; "The EFI Test Method For Accelerated Growth of Water Trees", Conference Record of 1990 IEEE International Symposium on Electrical Insulation, Toronto, Canada, pp. 191-194, (1990).

"Standard Test Method For Calculation of Carbon Distribution and Structural Group Analysis of Petroleum oils by The N-D-M Method", ASTM Designation D 3238-95 (Reapproved 2000), pp. 1-3, (2010).

International Search Report from the European Patent Office International Application PCT/IB2010/003342, mailing date Dec. 9, 2011.

Written Opinion of the International Searching Authority from the European Patent Office for International Application PCT/IB2010/003342, mailing date Dec. 9, 2011.

Decision on Grant from the Federal Service for Intellectual Property from corresponding Russian Application No. 2013131008 (Nov. 27, 2014).

English-Language abstract of Russian published application No. RU 2313841 (C1), (Dec. 27, 2007).

* cited by examiner

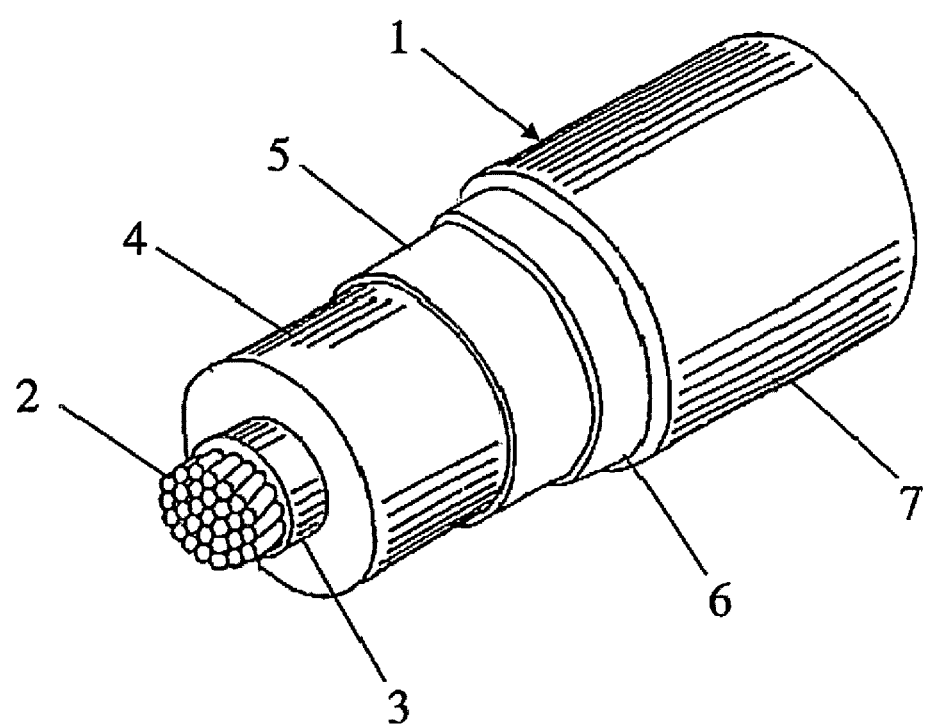

ENERGY CABLE HAVING STABILIZED DIELECTRIC RESISTANCE

CROSS REFERENCE TO RELATED APPLICATION

This application is a national phase application based on PCT/IB2010/003342, filed Dec. 23, 2010, the content of which is incorporated herein by reference.

BACKGROUND OF THE INVENTION

Field of the Invention

The present invention relates to an energy cable. In particular, the present invention relates to a cable for transporting or distributing electric energy, especially medium or high voltage electric energy, said cable having at least one thermoplastic electrically insulating layer.

Description of the Related Art

Cables for transporting electric energy generally include at least one cable core. The cable core is usually formed by at least one conductor sequentially covered by an inner polymeric layer having semiconductive properties, an intermediate polymeric layer having electrically insulating properties, an outer polymeric layer having semiconductive properties. Cables for transporting medium or high voltage electric energy generally include at least one cable core surrounded by at least one screen layer, typically made of metal or of metal and polymeric material. The screen layer can be made in form of wires (braids), of a tape helically wound around the cable core or a sheet longitudinally surrounding the cable core. The polymeric layers surrounding the at least one conductor are commonly made from a polyolefin-based crosslinked polymer, in particular crosslinked polyethylene (XLPE), or elastomeric ethylene/propylene (EPR) or ethylene/propylene/diene (EPDM) copolymers, also crosslinked, as disclosed, e.g., in WO 98/52197.

To address requirements for materials which should not be harmful to the environment both during production and during use, and which should be recyclable at the end of the cable life, energy cables have been recently developed having a cable core made from thermoplastic materials, i.e. polymeric materials which are not crosslinked and thus can be recycled at the end of the cable life.

In this respect, electrical cables comprising at least one coating layer, for example the insulation layer, based on a polypropylene matrix intimately admixed with a dielectric fluid are known and disclosed in WO 02/03398, WO 02/27731, WO 04/066317, WO 04/066318, WO 07/048, 422, and WO 08/058,572. The polypropylene matrix useful for this kind of cables comprises polypropylene homopolymer or copolymer or both, characterized by a relatively low cristallinity such to provide the cable with suitable flexibility, but not to impair mechanical properties and thermopressure resistance at the cable operative and overload temperatures. Performance of the cable coating, especially of the cable insulating layer, is also assisted by the presence of the dielectric fluid intimately admixed with said polypropylene matrix. The dielectric fluid should not affect the mentioned mechanical properties and thermopressure resistance and should be intimately and homogeneously admixed with the polymeric matrix.

More and more stringent long term cable performances, especially for medium and high voltage application, are increasingly requested by international standards, both for safety and economical reasons.

One of the major phenomenon possibly accelerating the cable ageing and shortening the lifetime thereof is the so called "water treeing" caused by moisture penetration into cable layers, especially into semiconductive and insulation layers. The moisture penetration and the consequent water trees are often eased by voids, defects (even micro-defects) and contaminants present in the layers.

In the field of energy cables having as insulating layer a crosslinked polyolefin composition, such as crosslinked polyethylene (XLPE) or crosslinked elastomeric ethylene/propylene (EPR) or ethylene/propylene/diene (EPDM) copolymers, it is known, in order to prevent water-treeing and the harmful consequences thereof, to add to the material forming the insulating layer small quantities of additives commonly known as "water tree retardants", which should be able to prevent the water tree growth and to promote the dielectric strength retention and, as a consequence, the longevity of the cable.

Various kinds of water tree retardants are known. For example, U.S. Pat. No. 4,370,517 aims to suppress the generation of water trees in the insulator of electrical machinery such as cables, etc. by incorporating into the insulator surrounding an electrical conductor a specified ester group content. Various sources of ester groups can be used. Namely, salts or esters of fatty acids can be incorporated into the polyolefin. As the fatty acid, stearic acid, sebacate acid or adipate acid can be used, but those of ordinary skill in this art will find that any fatty acid and preferably those having from 6 to 31 carbon atoms are suitable, the essential point being the presence of the ester group itself in the polyolefin composition. Examples of suitable fatty acid salts are cadmium stearate, lead stearate, zinc stearate, and lithium stearate. Suitable esters are esters of the above fatty acids and a polyol or glycol. Preferred polyols contain 5 to 6 carbon atoms. The glycol, e.g., polyethylene glycol may contain 2 to 46 carbon atoms. Specific examples of the esters include polyethylene glycol distearate, polypropylene adipate, polypropylene sebacate, stearic acid monoglyceride, sorbitan trioleate, sorbitan tristearate, polyoxyethylene sorbitan tristearate, etc.

Alternatively, according to the same U.S. Pat. No. 4,370, 517, the ester group can be introduced directly into the polyolefin polymer chain through the use of a predominantly polyolefin based copolymer containing as a comonomer a monomer containing an ester group, for example, ethylene-vinyl acetate copolymer (hereafter EVA), ethylene-ethyl acrylate copolymer (hereafter EEA), ethylene-methyl acrylate copolymer (hereafter EMA), ethylene-methyl methacrylate copolymer and mixtures of each of them.

U.S. Pat. No. 4,305,849 relates to a polyolefin composition far less vulnerable to the deterioration that occurs as dendroid voids when employed as an electrical insulation of high-tension power cables which are operated under water. In particular this document teaches a polyolefin composition for electrical insulation which comprises polyolefin or crosslinked polyolefin and a small quantity of high-molecular weight polyethylene glycol. High-molecular weight polyethylene glycol which characterizes this invention was selected from a series ranging from 1,000 to 20,000 in the molecular weight.

EP 0 814 485 relates to an improved electrical insulation composition that maintains high breakdown strength over time, by minimizing the formation of water trees. Improved water treeing resistance can be obtained by using additives wherein the hydrophilic portion is made up of polar units, preferably linear alkene oxide units and, more preferably, ethylene oxide. In a preferred embodiment the compatible portion is made of aliphatic, aromatic or low polarity units; preferably a hindered alkene oxide, and, more preferably the compatible portion is propylene oxide. Most preferably, the additive is an ethylene-oxide/propylene-oxide block copolymer.

WO 2010/072396 relates to a process for preparing polymer composition by blending a masterbatch which comprises at least one water tree retardant additive and a polyolefin and the use of said polymer composition for preparing an article, preferably a cable. Said masterbatch comprises preferably one or more water tree retardant additive(s) selected from the group comprising, among the other, a polyethylene glycol(s), an amido group containing fatty acid ester(s), an ethoxylated and/or propoxylated fatty acid(s).

Though mentioning a variety of polymeric materials suitable for insulation, or semiconductive layers, none of the prior art documents deals with the problem of inhibiting the growth of water trees and with the improvement of longevity of an electric cable having a layer, especially the insulation layer, based on a polypropylene compound including a dielectric fluid.

The presence of a dielectric fluid, even if intimately admixed within the polypropylene matrix, could constitute a weakening point for the insulating layer from the water-treeing point of view, especially in cables designed for medium or high voltage current transport.

SUMMARY OF THE INVENTION

With the aim of improving the long term dielectric resistance of a medium or high voltage electric cable with an insulating layer based on a thermoplastic material based on polypropylene admixed with a dielectric fluid, the Applicant carried out tests employing, for the above insulating layer, diverse materials known as water tree retardants for XLPE or EPR polymer base. The results showed to be unsatisfactory either from the electrical performance or from the manufacturing point of view, as it will be explained in the examples of the description.

In order to solve the above problem, the Applicant has considered the possibility of supplementing the electrically insulating layer with an additive acting as water tree retardant without influencing the other properties of the insulating material and particularly without negatively affecting the delicate balance of properties achieved by the combination of the thermoplastic polymer with the dielectric fluid.

The Applicant has found that the addition of a nonionic surfactant selected among the class of the ethoxylated fatty acids and amide derivatives thereof provides a cable with an insulating layer based on polypropylene admixed with a dielectric fluid, with a remarkable, long term dielectric stability. The selected class of nonionic surfactants can be compounded with the compound polypropylene/dielectric fluid and extruded without particular drawbacks with an industrially satisfactory outcome.

Therefore, the present invention relates to a cable comprising at least one electrical conductor and at least one electrically insulating layer surrounding said electrical conductor, wherein the at least one electrically insulating layer comprises:
  (a) a thermoplastic polymer material selected from:
    at least one copolymer (i) of propylene with at least one olefin comonomer selected from ethylene and an α-olefin other than propylene, said copolymer having a melting point greater than or equal to 130° C. and a melting enthalpy of from 20 J/g to 90 J/g;
    a blend of at least one copolymer (i) with at least one copolymer (ii) of ethylene with at least one α-olefin, said copolymer (ii) having a melting enthalpy of from 0 J/g to 70 J/g;
    a blend of at least one propylene homopolymer with at least one copolymer (i) or copolymer (ii);
    at least one of copolymer (i) and copolymer (ii) being a heterophasic copolymer;
  (b) at least one dielectric fluid intimately admixed with the thermoplastic polymer material;
  (c) at least one water tree retardant selected from ethoxylated fatty acids and amide derivatives thereof.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the present description and in the subsequent claims, as "conductor" it is meant an electrically conducting element usually made from a metallic material, more preferably aluminum, copper or alloys thereof, either as a rod or as a stranded multi-wire, or a conducting element as above coated with a semiconductive layer.

For the purposes of the invention the term "medium voltage" generally means a voltage of between 1 kV and 35 kV, whereas "high voltage" means voltages higher than 35 kV.

As "electrically insulating layer" it is meant a covering layer made of a material having insulating properties, namely a having a dielectric rigidity (dielectric breakdown strength) of at least 5 kV/mm, preferably greater than 10 kV/mm.

As "semiconductive layer" it is meant a covering layer made of a material having semiconductive properties, such as a polymeric matrix added with, e.g., carbon black such as to obtain a volumetric resistivity value, at room temperature, of less than 500 Ω·m, preferably less than 20 Ω·m. Typically, the amount of carbon black can range between 1 and 50% by weight, preferably between 3 and 30% by weight, relative to the weight of the polymer.

With "heterophasic copolymer" it is meant a copolymer in which elastomeric domains, e.g. of ethylene-propylene elastomer (EPR), are dispersed in a propylene homopolymer or copolymer matrix.

Preferably, the thermoplastic polymer material (a) has a melt flow index (MFI), measured at 230° C. with a load of 21.6 N according to ASTM Standard D1238-90, of from 0.05 dg/min to 10.0 dg/min, more preferably from 0.4 dg/min to 5.0 dg/min.

The olefin comonomer in copolymer (i) can be ethylene or an α-olefin of formula $CH_2=CH-R$, where R is a linear or branched $C_2$-$C_{10}$ alkyl, selected, for example, from: 1-butene, 1-pentene, 4-methyl-1-pentene, 1-hexene, 1-octene, 1-decene, 1-dodecene, or mixtures thereof. Propylene/ethylene copolymers are particularly preferred.

The olefin comonomer in copolymer (i) is preferably present in an amount equal to or lower than 15 mol %, more preferably equal to or lower than 10 mol %.

The olefin comonomer in copolymer (ii) can be an olefin of formula $CH_2=CHR$, wherein R represents a linear or branched alkyl group containing from 1 to 12 carbon atoms. Preferably, said olefin is selected from propylene, 1-butene, isobutylene, 1-pentene, 4-methyl-1-pentene, 1-hexene, 1-octene, 1-dodecene, or mixtures thereof. Propylene, 1-hexene and 1-octene are particularly preferred.

According to a preferred embodiment, copolymer (i) or copolymer (ii) is a random copolymer. With "random copolymer" it is meant a copolymer in which the comonomers are randomly distributed along the polymer chain.

Advantageously, in copolymer (i) or copolymer (ii) or both, when heterophasic, an elastomeric phase is present in an amount equal to or greater than 45 wt % with respect to the total weight of the copolymer.

Particularly preferred heterophasic copolymers (i) or (ii) are those wherein the elastomeric phase consists of an elastomeric copolymer of ethylene and propylene comprising from 15 wt % to 50 wt % of ethylene and from 50 wt % to 85 wt % of propylene with respect to the weight of the elastomeric phase.

Preferred copolymers (ii) are heterophasic propylene copolymers, in particular:

(ii-a) copolymers having the following monomer composition: 35 mol %-90 mol % of ethylene; 10 mol %-65 mol % of an aliphatic α-olefin, preferably propylene; 0 mol %-10 mol % of a polyene, preferably a diene, more preferably, 1,4-hexadiene or 5-ethylene-2-norbornene (EPR and EPDM rubbers belong to this class);

(ii-b) copolymers having the following monomer composition: 75 mol %-97 mol %, preferably 90 mol %-95 mol %, of ethylene; 3 mol %-25 mol %, preferably 5 mol %-10 mol %, of an aliphatic α-olefin; 0 mol %-5 mol %, preferably 0 mol %-2 mol %, of a polyene, preferably a diene (for example ethylene/1-octene copolymers).

Heterophasic copolymers can be obtained by sequential copolymerization of: 1) propylene, possibly containing minor quantities of at least one olefin comonomer selected from ethylene and an α-olefin other than propylene; and then of: 2) a mixture of ethylene with an α-olefin, in particular propylene, optionally with minor portions of a polyene.

The term "polyene" generally means a conjugated or non-conjugated diene, triene or tetraene. When a diene comonomer is present, this comonomer generally contains from 4 to 20 carbon atoms and is preferably selected from: linear conjugated or non-conjugated diolefins such as, for example, 1,3-butadiene, 1,4-hexadiene, 1,6-octa-diene, and the like; monocyclic or polycyclic dienes such as, for example, 1,4-cyclo-hexadiene, 5-ethylidene-2-norbornene, 5-methylene-2-norbornene, vinylnorborn-ene, or mixtures thereof. When a triene or tetraene comonomer is present, this comonomer generally contains from 9 to 30 carbon atoms and is preferably selected from trienes or tetraenes containing a vinyl group in the molecule or a 5-norbornen-2-yl group in the molecule. Specific examples of triene or tetraene comonomers which may be used in the present invention are: 6,10-dimethyl-1,5,9-undecatriene, 5,9-dimethyl-1,4,8-deca-triene, 6,9-dimethyl-1,5,8-decatriene, 6,8,9-trimethyl-1,6,8-decatriene, 6,10,14-trimeth-yl-1,5,9,13-pentadecatetraene, or mixtures thereof. Preferably, the polyene is a diene.

Preferably, copolymer (i), copolymer (ii) or both have a melting point of from 140° C. to 180° C.

Preferably, copolymer (i) has a melting enthalpy of from 25 J/g to 80 J/g.

Preferably, copolymer (ii) has a melting enthalpy of from 10 J/g to 30 J/g.

Advantageously, when the thermoplastic material of the insulating layer comprises a blend of copolymer (i) and copolymer (ii) the latter has a melting enthalpy lower than that of the first.

Advantageously, when the thermoplastic material of the insulating layer comprises a blend of copolymer (i) and copolymer (ii), the ratio between copolymer (i) and copolymer (ii) is of from 1:9 to 8:2, preferably of from 2:8 to 7:3.

Advantageously, when the thermoplastic material of the insulating layer comprises a blend of a propylene homopolymer and at least one of copolymer (i) and copolymer (ii), the ratio between the propylene homopolymer and copolymer (i) or copolymer (ii) or both is of from 0.5:9.5 to 5:5, preferably from 1:9 to 3:7.

As to the dielectric fluid (b), high compatibility between the dielectric fluid and the polymer base material is necessary to obtain a microscopically homogeneous dispersion of the dielectric fluid in the polymer base material. The dielectric fluid suitable for forming the cable covering layer of the present invention should comprise no polar compounds or only a limited quantity thereof, in order to avoid a significant increase of the dielectric losses.

Preferably, the concentration by weight of said at least one dielectric fluid in said thermoplastic polymer material is lower than the saturation concentration of said dielectric fluid in said thermoplastic polymer material. The saturation concentration of the dielectric fluid in the thermoplastic polymer material may be determined by a fluid absorption method on Dumbell specimens as described, for example, in WO 04/066317.

By using the dielectric fluid in an amount as defined above, thermomechanical properties of the insulating layer are maintained and exudation of the dielectric fluid from the thermoplastic polymer material is avoided.

The at least one dielectric fluid is generally compatible with the thermoplastic polymer material. "Compatible" means that the chemical composition of the fluid and of the thermoplastic polymer material is such as to result into a microscopically homogeneous dispersion of the dielectric fluid into the polymer material upon mixing the fluid into the polymer, similarly to a plasticizer.

Generally, the weight ratio between the at least one dielectric fluid (b) and the thermoplastic polymer material (a) may be from 1:99 to 25:75, preferably from 2:98 to 15:85.

It has to be noticed also that the use of a dielectric fluid with a relatively low melting point or low pour point (e.g. a melting point or a pour point not higher than 80° C.) allows an easy handling of the dielectric fluid which may be melted with no need of additional and complex manufacturing steps (e.g. a melting step of the dielectric fluid) and/or apparatuses for admixing the liquid with the polymer material.

According to a further preferred embodiment, the dielectric fluid has a melting point or a pour point of from −130° C. to +80° C.

The melting point may be determined by known techniques such as, for example, by Differential Scanning calorimetry (DSC) analysis.

According to a further preferred embodiment, the dielectric fluid has a predetermined viscosity in order to prevent fast diffusion of the liquid within the insulating layer and hence its outward migration, as well as to enable the dielectric fluid to be easily fed and mixed into the thermoplastic polymer material. Generally, the dielectric fluid of the invention has a viscosity, at 40° C., of from 5 cSt to 500 cSt, preferably of from 10 cSt to 100 cSt (measured according to ASTM standard D445-03).

For example, the dielectric fluid is selected from mineral oils, for example, naphthenic oils, aromatic oils, paraffinic oils, polyaromatic oils, said mineral oils optionally containing at least one heteroatom selected from oxygen, nitrogen or sulfur; liquid paraffins; vegetable oils, for example, soybean oil, linseed oil, castor oil; oligomeric aromatic polyolefins; paraffinic waxes, for example, polyethylene waxes, polypropylene waxes; synthetic oils, for example, silicone oils, alkyl benzenes (for example, dodecylbenzene, di(octylbenzyl)toluene), aliphatic esters (for example, tetraesters of pentaerythritol, esters of sebacic acid, phthalic esters), olefin oligomers (for example, optionally hydrogenated polybutenes or polyisobutenes); or mixtures thereof. Paraffinic oils and naphthenic oils are particularly preferred.

Mineral oils as dielectric fluid can comprise polar compound/s. The amount of polar compound/s advantageously is up to 2.3 wt %. Such a low amount of polar compounds allows obtaining low dielectric losses.

The amount of polar compounds of the dielectric fluid may be determined according to ASTM standard D2007-02.

Alternatively, the dielectric fluid can comprise at least one alkylaryl hydrocarbon having the structural formula:

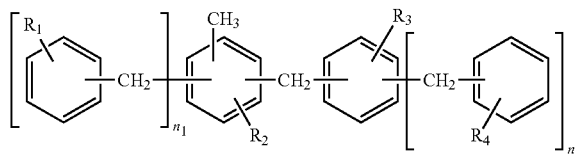

wherein:
$R_1$, $R_2$, $R_3$ and $R_4$, equal or different, are hydrogen or methyl;
$n_1$ and $n_2$, equal or different, are zero, 1 or 2, with the proviso that the sum n1+n2 is less than or equal to 3.

In another example, the dielectric fluid comprises at least one diphenyl ether having the following structural formula:

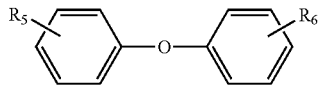

wherein $R_5$ and $R_6$ are equal or different and represent hydrogen, a phenyl group non-substituted or substituted by at least one alkyl group, or an alkyl group non-substituted or substituted by at least one phenyl. By alkyl group it is meant a linear or branched $C_1$-$C_{24}$, preferably $C_1$-$C_{20}$, hydrocarbon radical.

Suitable dielectric fluids for use in the covering layer for the cable of the invention is described, e.g., in WO 02/027731, WO 02/003398 or WO 04/066317, all in the Applicant's name.

The water tree retardants (c) according to the present invention may be selected from ethoxylated fatty acids and amide derivatives thereof.

Ethoxylated fatty acids useful in the present invention have, in particular, the general formula Ia:

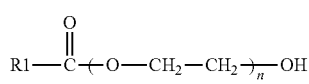

wherein R1 is a fatty acid residue $C_6$-$C_{31}$, preferably $C_8$-$C_{25}$, and n is an integer of from 4 to 25.

Examples of ethoxylated fatty acids useful for the present invention are: stearic acid ethoxylate, lauric acid ethoxylate, oleic acid ethoxylate, myristic acid ethoxylate, coconut fatty acid ethoxylate, palmitic acid ethoxylate, linoleic acid ethoxylate, linolenic acid ethoxylate, tallow fatty acid ethoxylate, sebacic acid ethoxylate, azelaic acid ethoxylate, or mixtures thereof.

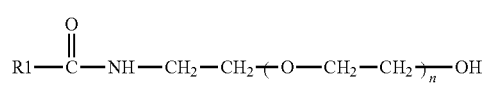

Amide derivatives of ethoxylated fatty acids useful in the present invention have, in particular, the general formula Ib:
wherein R1 is a fatty acid residue $C_6$-$C_{31}$, preferably $C_8$-$C_{25}$, and n is an integer of from 4 to 25.

Amide derivatives of ethoxylated fatty acids useful for the present invention are: stearoyl ethanolamide ethoxylate, lauryl amide ethoxylate, oleyl amide ethoxylate, myristyl amide ethoxylate, coconut monoethanolamide ethoxylate, elaidyl amide ethoxylate, sebacoyl amide ethoxylate, azelaoyl amide ethoxylate, or mixtures thereof.

It is worth noting that the water tree retardants (c) according to formulas (Ia) e (Ib) are usually mixtures of products having different fatty acid residues R1 and/or different values of n.

Preferably, said at least one water tree retardant is present in the electrically insulating layer in an amount of from 0.05 to 2% by weight, more preferably from 0.1 to 1% by weight, with respect to the total weight of the insulating layer.

Other components may be added in minor amounts to the thermoplastic polymer material according to the present invention, such as antioxidants, processing aids, water tree retardants, or mixtures thereof.

Conventional antioxidants suitable for the purpose are, for example, distearyl- or dilauryl-thiopropionate and pentaerythrityl-tetrakis[3-(3,5-di-t-butyl-4-hydroxyphen-yl)-propionate], or mixtures thereof.

Processing aids which may be added to the polymer composition include, for example, calcium stearate, zinc stearate, stearic acid, or mixtures thereof.

According to a preferred embodiment, the cable according to the present invention includes also at least one semiconductive layer. The semiconductive layer is preferably formed by a semiconductive material comprising components (a) and (b) as disclosed above, and optionally at least one water tree retardant (c) according to the invention, at least one conductive filler (d), preferably a carbon black filler.

The at least one conductive filler is generally dispersed within the thermoplastic polymer material in a quantity such as to provide the material with semiconductive properties, namely to obtain a volumetric resistivity value, at room temperature, of less than 500 Ω·m, preferably less than 20 Ω·m. Typically, the amount of carbon black can range between 1 and 50% by weight, preferably between 3 and 30% by weight, relative to the weight of the polymer.

The use of the same base polymer composition for both the insulating layer and the semiconductive layers is particularly advantageous in producing cables for medium or high voltage, since it ensures excellent adhesion between adjacent layers and hence a good electrical behavior, particularly at the interface between the insulating layer and the inner semiconductive layer, where the electrical field and hence the risk of partial discharges are higher.

The polymeric compositions for the cable according to the present invention may be produced by mixing together the thermoplastic polymer material, the dielectric fluid, the water tree retardant and any other optional additive, by using methods known in the art. Mixing may be carried out for example by an internal mixer of the type with tangential rotors (Banbury) or with interpenetrating rotors; in a continuous mixer of Ko-Kneader (Buss) type, of co- or counter-rotating double-screw type; or in a single screw extruder.

According to a preferred embodiment, the dielectric fluid may be added to the thermoplastic polymer material during the extrusion step by direct injection into the extruder cylinder as disclosed, for example, in International Patent Application WO 02/47092 in the name of the Applicant.

Although the present description is mainly focused on cables for transporting or distributing medium or high voltage energy, the polymer composition of the invention may be used for coating electrical devices in general and in particular cable of different type, for example low voltage cables (i.e. cables carrying a voltage lower than 1 kV), telecommunications cables or combined energy/telecommunications cables, or accessories used in electrical lines, such as terminals, joints, connectors and the like.

BRIEF DESCRIPTION OF THE DRAWING

Further characteristics will be apparent from the detailed description given hereinafter with reference to the accompanying drawing, in which:

FIG. 1 is a perspective view of an energy cable, particularly suitable for medium or high voltage, according to the invention.

DETAILED DESCRIPTION OF THE PREFERRED EMBODIMENTS

In FIG. 1, the cable (1) comprises a conductor (2), an inner layer with semiconductive properties (3), an intermediate layer with insulating properties (4), an outer layer with semiconductive properties (5), a metal screen layer (6) and a sheath (7).

The conductor (2) generally consists of metal wires, preferably of copper or aluminum or alloys thereof, stranded together by conventional methods, or of a solid aluminum or copper rod.

The insulating layer (4) may be produced by extrusion, around the conductor (2), of a composition according to the present invention.

The semiconductive layers (3) and (5) are also made by extruding polymeric materials usually based on polyolefins, preferably a composition according to the present invention, made to be semiconductive by adding at least one conductive filler, usually carbon black.

Around the outer semiconductive layer (5), a metal screen layer (6) is usually positioned, made of electrically conducting wires or strips helically wound around the cable core or of an electrically conducting tape longitudinally wrapped and overlapped (preferably glued) onto the underlying layer. The electrically conducting material of said wires, strips or tape is usually copper or aluminum or alloys thereof.

The screen layer (6) may be covered by a sheath (7), generally made from a polyolefin, usually polyethylene.

The cable can be also provided with a protective structure (not shown in FIG. 1) the main purpose of which is to mechanically protect the cable against impacts or compressions. This protective structure may be, for example, a metal reinforcement or a layer of expanded polymer as described in WO 98/52197 in the name of the Applicant.

The cable according to the present invention may be manufactured in accordance with known methods, for example by extrusion of the various layers around the central conductor. The extrusion of two or more layers is advantageously carried out in a single pass, for example by the tandem method in which individual extruders are arranged in series, or by co-extrusion with a multiple extrusion head. The screen layer is then applied around the so produced cable core. Finally, the sheath according to the present invention is applied, usually by a further extrusion step.

The cable of the present invention is preferably used for alternating current (AC) power transmission.

FIG. 1 shows only one embodiment of a cable according to the invention. Suitable modifications can be made to this embodiment according to specific technical needs and application requirements without departing from the scope of the invention.

The following examples are provided to further illustrate the invention.

Examples 1-4

The following compositions were prepared with the amounts reported in Table 1 (expressed as % by weight with respect to the total weight of the composition).

In all of the examples, the polypropylene material was fed directly into the extruder hopper. Subsequently, the dielectric fluid, previously mixed with the antioxidants and the water tree retardant (if any), was injected at high pressure into the extruder. An extruder having a diameter of 80 mm and a L/D ratio of 25 was used. The injection was made during the extrusion at about 20 D from the beginning of the extruder screw by means of three injection points on the same cross-section at 120° from each other. The dielectric fluid was injected at a temperature of 70° C. and a pressure of 250 bar.

TABLE 1

| EXAMPLE | 1* | 2 | 3 | 4 |
| --- | --- | --- | --- | --- |
| Adflex ™ Q200F | 89.7 | 89.2 | 89.2 | 89.45 |
| Nyflex ™ 800 | 10 | 10 | 10 | 10 |
| Neopal ™ CO 5 | — | 0.5 | — | — |
| Sinerex ™ AS | — | — | 0.5 | 0.25 |
| antioxidant | 0.3 | 0.3 | 0.3 | 0.3 |

*comparative
Adflex ™ Q200F: propylene heterophase copolymer having melting point 165° C., melting enthalpy 30 J/g, and flexural modulus 150 MPa (Lyondell Basell);
Nyflex ™ 800: naphthenic oil, CAS No. 64742-53-6 (Nynas AB)
Neopal ™ CO 5: coconut oil fatty acids, ethoxylated monoethanolamide, CAS 68425-44-5;
ethylene oxide EO residue: 5 (Industria Chimica Panzeri);
Sinerex ™ AS: ethoxylated stearic acid, CAS 9004-99-3, ethylene oxide EO residue: 5-20 (Industria Chimica Olimpia Tensioattivi)
antioxidant: 4,6-bis (octylthiomethyl)-o-cresol.

The dielectric breakdown strength (DS) of the polymer compositions obtained was evaluated on test-pieces of insulating material having the geometry proposed by the EFI (Norwegian Electric Power Research Institute) in the publication "The EFI Test method for Accelerated Growth of Water Trees" (IEEE International Symposium on Electrical Insulation, Toronto, Canada, Jun. 3-6 1990). In this method, the cable is simulated with glass-shaped test-pieces of insulating material having their base coated on both sides with a semiconductive material coating. The glass-shaped test pieces were formed by moulding discs of insulating material at 160-170° C. from a plate 10 mm thick obtained by compressing each blend of Examples at about 190° C.

The inner and outer surfaces of the base, which had a thickness of about 0.40-0.45 mm, were coated with a semi-conductive coating. The DS measurement was made by applying to these specimens, immersed in saline at 40° C., an alternating current at 50 Hz starting with a voltage of 0 kV and increasing in steps of 2 kV/sec until perforation of the test-piece occurred. The voltage stress was a measure of a 12 kV/mm electric field gradient. Each measurement was repeated on 15 test-pieces. The values given in Table 2 are the arithmetic mean of the individual measured values. Four series of experiments were carried out. The above screening of the specimens is necessary to exclude those which are defective because of the moulding process.

Dielectric strength (DS) values of the tested samples are reported in Table 2.

TABLE 2

| EXAMPLE | DS kV/mm 0 day | DS kV/mm 12 days | DS kV/mm 30 days | DS kV/mm 60 days |
|---|---|---|---|---|
| 1* | 95 | 76 | — | 58 |
| 2 | 96 | 99 | 103 | 98 |
| 3 | 97 | 89 | 106 | 84 |
| 4 | 92 | 104 | 101 | 113 |

*comparative

Even after 60 days at 40° C. in saline, the samples containing the water tree retardants according to the invention maintained a substantially unchanged dielectric strength, whereas the comparative sample (not containing any water tree retardant) showed a significant decrease in dielectric strength just after 12 days under the same experimental conditions.

Examples 5-7

Following the same preparation procedure of Examples 1-4, the following comparative compositions were prepared with the amounts reported in Table 3 (expressed as % by weight with respect to the total weight of the composition).

TABLE 3

| EXAMPLE | 5 | 6 | 7 |
|---|---|---|---|
| Adflex ™ Q200F | 94.0 | 84.0 | 84.0 |
| Jarylec ™ Exp3 | 5.7 | 5.7 | 5.7 |
| Lotryl ™ 17 BA 04 | — | 10 | — |
| Lotryl ™ 30 BA 02 | — | — | 10 |
| antioxidant | 0.3 | 0.3 | 0.3 |

Adflex ™ Q200F: propylene heterophase copolymer having melting point 165° C., melting enthalpy 30 J/g, and flexural modulus 150 MPa (Lyondell Basell);
Jarylec ™ Exp3: dibenzyltoluene (DBT) (Elf Atochem);
Lotryl ™ 17 BG 04: ethylene butyl acrylate copolymer (Arkema);
Lotryl ™ 30 BA02: ethylene butyl acrylate copolymer (Arkema);
antioxidant: primary (phenolic) antioxidant.

The dielectric breakdown strength (DS) of sample cables (5 m long) having an insulating layer based on the composition of Examples 1-5 was evaluated in alternating current condition. The DS measurements were made by applying to these sample cables. In water at 80° C., an alternating current at 50 Hz starting with a voltage of 50 kV and increasing in steps of 10 kV every 10 minutes until perforation of the test-piece occurred. The results are given in Table 4.

TABLE 4

| EXAMPLE | DS kV/mm 0 day | DS kV/mm 30 days | DS kV/mm 90 days |
|---|---|---|---|
| 5 | 78 | 37 | 25 |
| 6 | 75 | 36 | 39 |
| 7 | 67 | 40 | 34 |

Sample cables wherein the insulating polypropylene base material of the invention was added with water tree retardant copolymer containing as a comonomer a monomer containing an ester group, according to the prior art showed a dielectric behavior substantially similar to that of a sample cable not added with such a water tree retardant.

The addition of ester containing polymers known as water tree retardant did not provide significant results in insulating layer based on the polypropylene/dielectric fluid mixture according to the invention.

Other compounds known as water-tree retardants, such as PEG 20,000 (disclosed, for example, by U.S. Pat. No. 4,305,849) and ethylene-oxide/propylene-oxide block copolymer (disclosed, for example, by EP 0 814 485) gave place to manufacturing problems when compounded with the polypropylene/dielectric fluid insulating material of the invention. In particular, the stability of the above mentioned water tree retardants was challenged and, above all, the extrudates containing these additives resulted to be thermally spoiled and unsatisfactory from an industrial point of view.

The invention claimed is:

1. A cable comprising at least one electrical conductor and at least one electrically insulating layer surrounding said electrical conductor, wherein the at least one electrically insulating layer comprises:
  (a) a thermoplastic polymer material selected from:
    at least one copolymer (i) of propylene with at least one olefin comonomer selected from ethylene and an α-olefin other than propylene, said copolymer having a melting point greater than or equal to 130° C. and a melting enthalpy of 20 J/g to 90 J/g;
    a blend of at least one copolymer (i) with at least one copolymer (ii) of ethylene with at least one α-olefin, said copolymer (ii) having a melting enthalpy of 0 J/g to 70 J/g; and
    a blend of at least one propylene homopolymer with at least one copolymer (i) or copolymer (ii);
    at least one of copolymer (i) and copolymer (ii) being a heterophasic copolymer;
  (b) at least one dielectric fluid intimately admixed with the thermoplastic polymer material; and
  (c) at least one water tree retardant selected from ethoxylated fatty acids and amide derivatives thereof.

2. The cable according to claim 1, wherein the copolymer (i) is a propylene/ethylene copolymer.

3. The cable according to claim 1, wherein, in copolymer (i) or copolymer (ii) or both, when heterophasic, an elastomeric phase is present in an amount equal to or greater than 45 wt % with respect to the total weight of the copolymer.

4. The cable according to claim 1, wherein copolymer (i) has a melting enthalpy of 25 J/g to 80 J/g.

5. The cable according to claim 1, wherein copolymer (ii) has a melting enthalpy of 10 J/g to 30 J/g.

6. The cable according to claim 1, wherein weight ratio between the at least one dielectric fluid (b) and the thermoplastic polymer material (a) is 1:99 to 25:75.

7. The cable according to claim 1, wherein the water tree retardant (c) is an ethoxylated fatty acid of formula Ia:

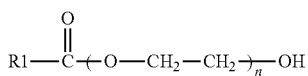

wherein R1 is a fatty acid residue $C_6$-$C_{31}$, and n is an integer of 4 to 25.

8. The cable according to claim 7, wherein R1 is a fatty acid residue $C_8$-$C_{25}$.

9. The cable according to claim 7, wherein the ethoxylated fatty acid is selected from: stearic acid ethoxylate, lauric acid ethoxylate, oleic acid ethoxylate, myristic acid ethoxylate, coconut fatty acid ethoxylate, palmitic acid ethoxylate, linoleic acid ethoxylate, linolenic acid ethoxylate, tallow fatty acid ethoxylate, sebacic acid ethoxylate, azelaic acid ethoxylate, and mixtures thereof.

10. The cable according to claim 1, wherein the water tree retardant (c) is an amide derivative of ethoxylated fatty acid of formula Ib:

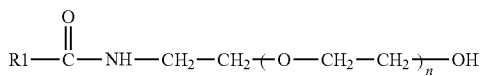

wherein R1 is a fatty acid residue $C_6$-$C_{31}$, and n is an integer of 4 to 25.

11. The cable according to claim 10, wherein R1 is a fatty acid residue $C_8$-$C_{25}$.

12. The cable according to claim 10, wherein the amide derivative is selected from: stearoyl ethanolamide ethoxylate, lauryl amide ethoxylate, oleyl amide ethoxylate, myristyl amide ethoxylate, coconut monoethanolamide ethoxylate, elaidyl amide ethoxylate, sebacoyl amide ethoxylate, azelaoyl amide ethoxylate, and mixtures thereof.

13. The cable according to claim 1, wherein said at least one water tree retardant (c) is present in an amount of 0.05 to 2% by weight with respect to the total weight of the insulating layer.

14. The cable according to claim 13, wherein said at least one water tree retardant (c) is present in an amount of 0.1 to 1% by weight with respect to the total weight of the insulating layer.

15. The cable according to claim 1, having at least one semiconductive layer comprising at least one water tree retardant (c).

* * * * *